June 17, 1941.   N. B. MOORE   2,245,933

RIVET

Filed Aug. 26, 1940

Inventor
Norman B. Moore
By Lyon & Lyon
Attorneys

Patented June 17, 1941

2,245,933

UNITED STATES PATENT OFFICE 2,245,933

RIVET

Norman B. Moore, Los Angeles, Calif.

Application August 26, 1940, Serial No. 354,151

1 Claim. (Cl. 85—37)

This invention relates to rivets and particularly to sheet metal rivets for securing relatively thin sheets to other sheets or structural elements.

An object of the invention is to reduce failure of riveted joints in sheet metal.

More specifically, it is an object of the invention to reduce or prevent splitting and spreading of thin sheet metal around the rivet holes by the riveting operation.

The foregoing objects are achieved in accordance with the invention by employing a rivet, the head of which is recessed on the underside immediately surrounding the shank, whereby compressive forces applied to the sheet metal by the rivet when the latter is upset in the riveting operation are applied to the sheet over an annular area spaced from the rivet hole, instead of along the margins of the rivet hole.

A complete understanding of the invention may be had from the detail description, with reference to the drawing of one form of rivet in accordance with the invention and its manner of use.

Figure 1:
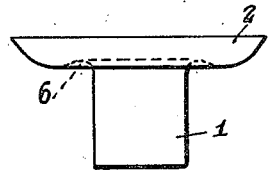
Fig. 1 is a side view of one form of rivet in accordance with the invention.
Figure 2:
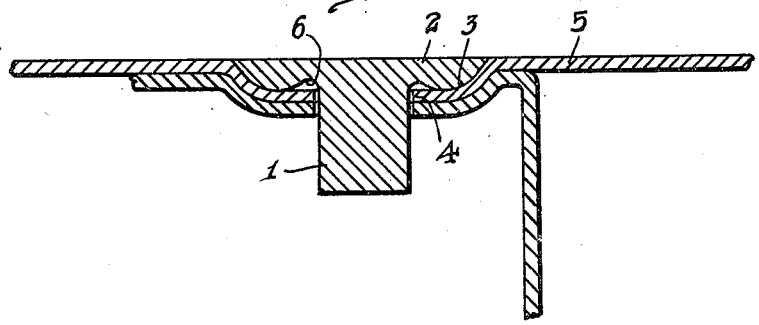
Fig. 2 is a sectional view, showing the rivet of Fig. 1 in place in the rivet hole of a pair of sheet members to be joined prior to the riveting operation.

Referring to Figs. 1 and 2, the rivet therein illustrated consists of a cylindrical shank 1 merging into a head 2. The particular rivet disclosed is intended for forming a flush joint with the outer skin of metal and to this end the head has a flat, upper surface and is angled inwardly and downwardly at the edges on the underside, so as to fit within a recess 3 surrounding the rivet hole 4 in the outer skin 5. This recess 3 may be formed in the outer skin 5 before the rivet is placed in position. On the other hand, in some instances the recess 3 may be formed by forcing the rivet head into the skin 5 while supporting the latter on the underside by a suitable die. In any event, it is old to countersink rivets in sheet metal, and such countersinking does not constitute a part of the present invention.

Figure 3:
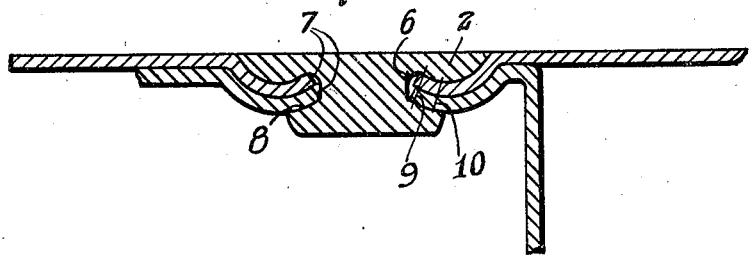
Fig. 3 is a view similar to Fig. 2 but showing the condition of the elements after the completion of the riveting operation.

The present rivet differs essentially from prior known rivets, in that the underside of the head 2 of the rivet has an annular recess 6 closely adjacent the shank 1. When the shank 1 of the rivet is upset in the riveting operation, as shown in Fig. 3, the edges 7 of the sheet metal immediately adjacent the rivet hole, are forced upwardly into the recess 6 by virtue of the fact that in the normal riveting operation the shank, when upset, thickens so that the upset portion of the shank has an upper surface 8 that is substantially frusto-conical in shape. This frusto-conical shape is inherent in all rivets and frequently causes spreading and splitting of the sheet metal when the underside of the head of the rivet is flat, as in prior practice. Thus it will be readily apparent from Fig. 3 that if the underside of the head 2 were perfectly flat, thereby eliminating the annular recess 6, the maximum pressure on the sheet metal would be closely adjacent the edges thereof, as indicated by line 9. This would tend to squeeze the edges of the metal radially outwardly and when the metal is thin it frequently splits and spreads in response to the forces along the inner edges of the sheet members.

However, with my construction, by virtue of the fact that the underside of the head is recessed closely adjacent the shank, the maximum pressure between the upset shank and the head of the rivet is developed along a line 10 (the lines 9 and 10 really represent sections of annular surfaces extending all the way around the rivet) which is spaced radially from the inner edges of the sheet members a substantial distance. As a result the sheet metal members are firmly gripped and compressed between the shank and the head of the rivet at the line 10 so that even if there is thereafter developed forces tending to squeeze the edges of the sheet metal members outwardly, any such spreading movement of the members is prevented by the fact that they are gripped together along the line 10.

The invention is particularly useful in the riveting of thin skins of material, such as aluminum alloys in airplane construction, but is in no sense limited to such application.

Furthermore, it is to be understood that although the invention is disclosed incorporated in a flat top rivet adapted for flush riveting, it is in no sense limited to such rivets, but is also useful in round headed rivets and oval headed rivets, or rivets in which the upper surface of the head has any possible shape.

Although for the purpose of explaining the invention a specific embodiment thereof has been described in substantial detail, it is to be understood that various changes may be made in the particular construction shown without departing from the invention, which is to be limited only to the extent set forth in the appended claim.

I claim:

A flush rivet for sheet metal comprising: a shank, a head on one end of said shank, said head having a flat upper surface, the upper and lower surfaces of the head merging into an edge at the periphery of the head, the under surface of the head being convex in radial cross section between the peripheral edge and the shank, and being substantially thinner closely adjacent the shank than at points radially intermediate the shank and said peripheral edge.

NORMAN B. MOORE.